United States Patent
Castel et al.

[11] Patent Number: 5,934,075
[45] Date of Patent: Aug. 10, 1999

[54] BOOSTER WITH PREFILLING WITHOUT LIMITATION IN FLOWRATE

[75] Inventors: Philippe Castel, Paris; Guy Meynier, Aulnay-sous-Bois; Jacques Nollez, Paris, all of France

[73] Assignee: Bosch Systems de Freinage, Drancy, France

[21] Appl. No.: 08/596,352

[22] PCT Filed: Feb. 22, 1996

[86] PCT No.: PCT/FR96/00283

§ 371 Date: Mar. 8, 1996

§ 102(e) Date: Mar. 8, 1996

[87] PCT Pub. No.: WO96/29221

PCT Pub. Date: Sep. 26, 1996

[30] Foreign Application Priority Data

Mar. 17, 1995 [FR] France ................................. 95 03101

[51] Int. Cl.⁶ .................................................. B60T 13/565

[52] U.S. Cl. .................................. 60/552; 60/588; 60/589

[58] Field of Search ............................ 60/551, 552, 553, 60/554, 586, 588, 589, 547.3

[56] References Cited

U.S. PATENT DOCUMENTS

| | | | |
|---|---|---|---|
| 3,911,681 | 10/1975 | Sisco | 60/553 |
| 3,914,941 | 10/1975 | Gardner | 60/553 |
| 4,033,131 | 7/1977 | Gardner | 60/553 |
| 4,417,445 | 11/1983 | Furuta | 60/553 |

FOREIGN PATENT DOCUMENTS

| | | |
|---|---|---|
| 4005586 | 8/1991 | Germany. |
| 2156930 | 10/1985 | United Kingdom. |
| 94/07722 | 4/1994 | WIPO. |

*Primary Examiner*—John E. Ryznic
*Attorney, Agent, or Firm*—Leo H. McCormick, Jr.; Warren Comstock

[57] ABSTRACT

A boosted braking device having a master cylinder and a pneumatic booster wherein the force for actuating the master cylinder is derived from a combination of an input force and a boost force of the booster. A main hydraulic piston of the master cylinder has a holler cylinder for receiving the input force. A secondary hydraulic piston located within the holler cylinder of the main hydraulic piston receives a hydraulic reaction force to impart an increasing braking force corresponding to an input force applied over an entire travel of a brake pedal.

5 Claims, 5 Drawing Sheets

BOOSTER WITH PREFILLING WITHOUT LIMITATION IN FLOWRATE

The present invention relates to a boosted braking device for a motor vehicle, comprising: a master cylinder exhibiting at least one primary hydraulic chamber filled with a brake fluid and closed by a main hydraulic piston designed to receive an actuating force composed of an input force and of a boost force both acting in an axial direction; and a pneumatic booster capable of applying the actuating force to the main hydraulic piston, in response to the application of the input force on an operating rod controlling the opening of a valve borne by a pneumatic piston which can move with the operating rod, the booster itself including a rigid casing divided in leaktight fashion into two chambers by means at least of a moving partition which can be urged by a pressure difference established selectively between the two chambers through the opening of the valve, the input force being transmitted via a reaction disk against which the pneumatic piston also bears in order to supply it with a first part at least of the boost force, the moving partition being slidably mounted on the pneumatic piston, and the main hydraulic piston of the master cylinder comprising an annular piston sliding in leaktight fashion in a bore of the master cylinder, and an internal piston sliding in leaktight fashion inside the annular piston.

BACKGROUND OF THE INVENTION

A device of this type is known in the prior art, at least from document FR-A-2,700,513.

Such a braking device has the advantage, resulting from the use of a moving partition mounted so as to be able to slide relative to the pneumatic piston until it comes into abutment with the latter, that the braking force increases more uniformly, as a function of the travel of the operating rod and therefore of the brake pedal, than in the prior devices.

However, the obtaining of a uniform increase in the braking force can still be improved in braking devices of this type, insofar as the moment at which the pneumatic piston is carried along by the moving wall depends on conditions of depression of the brake pedal and insofar as mastering the effects of the pneumatic piston being carried along by the moving wall assumes tricky optimization of a multitude of parameters.

SUMMARY OF THE INVENTION

The object of the present invention is precisely to improve this known device in order to make it possible easily to produce a boosted braking device using hydraulic reaction which can exert an increasing braking force over the entire travel of the brake pedal, in a very uniform manner.

To this end, the device of the present invention is essentially characterized in that the reaction disk bears against the annular piston, in that the moving partition bears against the internal piston in order to transmit a second part of the boost force thereto, in that the main hydraulic piston comprises, apart from the annular piston and the internal piston, an additional piston capable of receiving from the internal piston a thrust able to make it slide in the bore, in that the annular, internal and additional pistons together define, inside the bore, a variable annular volume which is connected to a low-pressure brake fluid supply circuit for as long as the annular piston has not gone beyond a position where braking is initiated, and in that communication means are provided to establish, between the annular volume and the primary hydraulic chamber, a communication allowing the passage of brake fluid only provided at least that the additional piston is distant from the annular piston merely by a distance not exceeding a length of predetermined magnitude.

According to a first possible embodiment of the invention, the communication means comprise a hollow bearing surface integral with the additional piston and pointing towards the primary hydraulic chamber, a seal sliding over this hollow bearing surface between a bearing face of a collar of outside diameter d and a stop ring, both integral with the bearing surface, and a sliding ring sliding in the bore, and of which a first end bears against the annular piston and a second end of inside diameter D, greater than the outside diameter d of the collar, can come into contact with the seal beyond the bearing face of the said collar, thus opening up the said communication when the additional piston is separated from the annular piston merely by a distance not exceeding the said length of predetermined magnitude.

According to a second possible embodiment of the invention, the communication means comprise a passage made in the additional piston and bearing a seat selectively closed off by a sealing member operated by a push-rod capable of bearing against the annular piston in order to free the seat when the additional piston is separated from the annular piston merely by a distance not exceeding the said length of predetermined magnitude.

According to a third possible embodiment of the invention, the communication means comprise a passage consisting of an orifice open into the primary hydraulic chamber, connected to the low-pressure brake fluid supply circuit and uncovered when the distance between hollow moving cylinder and secondary hydraulic piston does not exceed the said length of predetermined magnitude.

According to the various possible embodiments of the invention, the internal piston and the additional piston are made of at least two elements.

Other features and advantages of the invention will emerge clearly from the description thereof which is given hereafter, by way of non-limiting indication, with reference to the appended drawings.

DETAILED DESCRIPTION OF THE INVENTION

Figure 1:
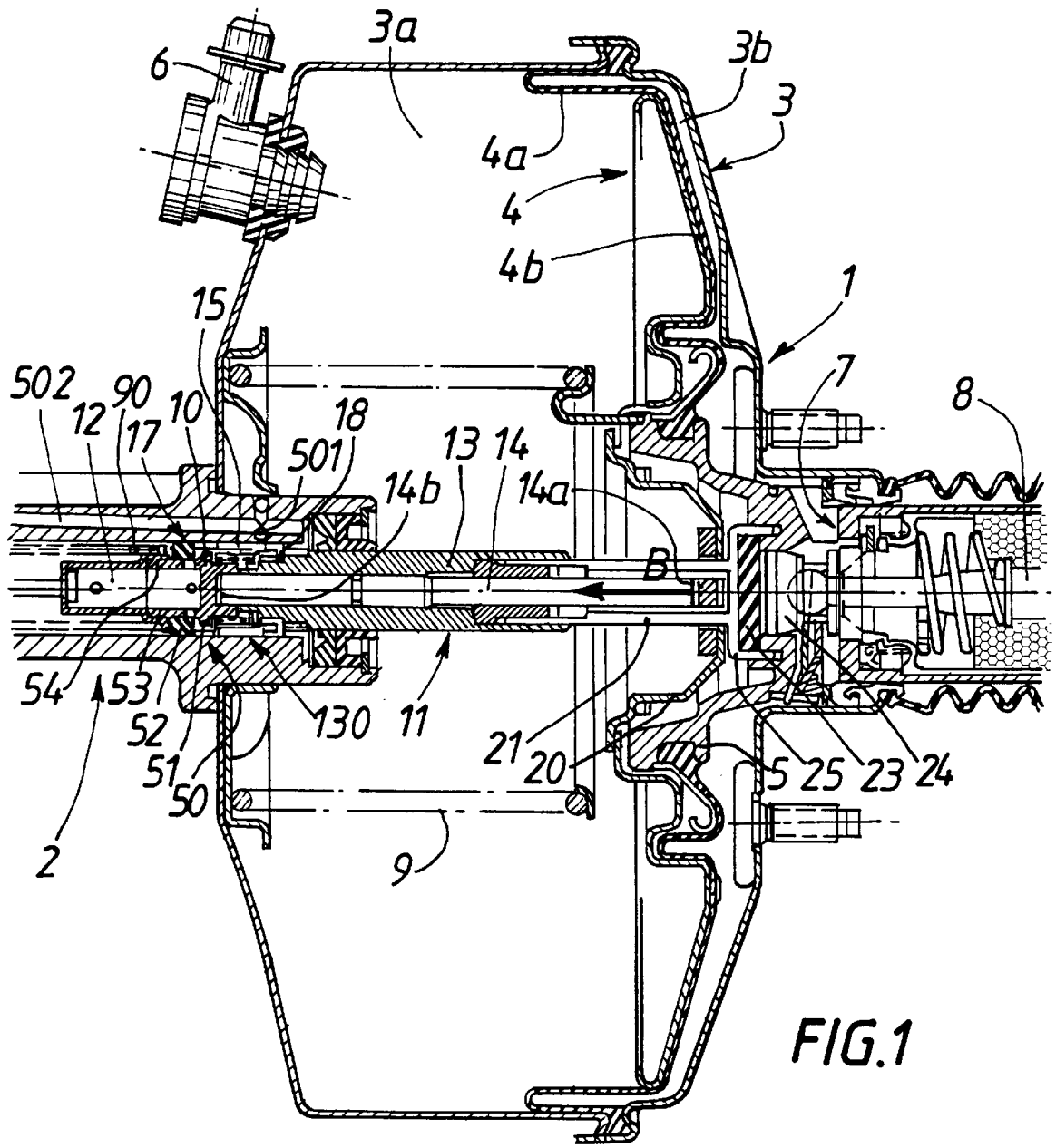
FIG. 1 is a part sectional view of a device in accordance with a first embodiment of the invention, represented in its position of rest.

The invention relates in general to an improvement made to known pneumatically boosted braking systems of the type which comprise a booster 1 and a master cylinder 2.

In the conventional way, the master cylinder 2 exhibits at least one primary hydraulic chamber 12 filled with a braking fluid and closed by a main hydraulic piston 11.

This master cylinder may be actuated by applying, to the hydraulic piston 11, an actuating force which in this case is composed of an input force and of a boost force, both acting in an axial direction B.

The specific function of the pneumatic booster 1 is to apply this actuating force to the main hydraulic piston, in response to the application of the input force to an operating rod 8 which controls the opening of a pneumatic valve 7, this valve 7 being borne by a pneumatic piston 5 which can move with the operating rod 8.

To this end, the booster 1 in known fashion includes a rigid casing 3 divided in leaktight fashion into two chambers 3a, 3b by means at least of a moving partition 4 which can be urged by a pressure difference selectively established between the two chambers through the opening of the valve 7.

More precisely, the front chamber 3a, the front face of which is closed in leaktight fashion by the master cylinder 2, is permanently connected to a source of partial vacuum (not represented) through a nonreturn valve 6, while the pressure in the rear chamber 3b is controlled by the valve 7, operated by the operating rod 8, which is connected to a brake pedal (not represented).

The input force applied by the brake pedal is transmitted to the main hydraulic piston 11 via a reaction disk 23, against which the operating rod 8 bears via a plunger 24, and against which the pneumatic piston 5 also bears in order to impart a first part of the boost force to this reaction disk.

In fact, the invention relates more particularly to a braking system in which the moving partition 4 of the booster 1 is slidably mounted on the pneumatic piston 5, and in which the main hydraulic piston 11 of the master cylinder comprises, on the one hand, an annular piston 13 sliding in leaktight fashion in a bore 130 of the master cylinder and, on the other hand, an internal piston 14 sliding in leaktight fashion inside the annular piston, in accordance with the teaching of the previously-mentioned document FR-A-2, 700,513.

The operation of the hitherto known and described device, is as follows.

When the operating rod 8 is in the position of rest, in this case pulled to the right, the valve 7 normally establishes a communication between the two chambers 3a and 3b of the booster, or comes from a position in which this communication was established.

The rear chamber 3b then being subjected to the same partial vacuum as the front chamber 3a, the piston 5 under the rigid skirt 4b are pushed back to the right, into the position of rest, by the spring 9 and the spring 90 of the master cylinder.

Actuating the operating rod 8 towards the left firstly has the effect of shifting the valve 7 so that it isolates the chambers 3a and 3b from one another, then secondly has the effect of shifting this valve so that it opens the rear chamber 3b to atmospheric pressure.

The pressure difference therefore established between the two chambers and applied to the moving partition 4 and to the pneumatic piston 5, particularly via the diaphragm 4a, gives rise to a thrust which constitutes a boost force, which is added to the braking force exerted on the operating rod 8, or "input force", in order to form the actuating force applied to the main hydraulic piston 11.

According to the invention, the reaction disk 23 bears against the annular piston 13 in order to transmit to it the input force coming from the plunger 24 and the first part of the boost force coming from the piston 5, while the internal piston 14 on a first end 14a pointing towards the skirt 4b receives the second part of the boost force coming from this skirt, through the ring 20, and transmits it to an additional piston 10 via a second end 14b, thus causing the additional piston 10 to slide in the bore 130 off the master cylinder.

The annular, internal and additional pistons together define, inside the bore 130 of the master cylinder, a variable volume 15 communicating via the orifice 501 with the low-pressure brake fluid supply circuit 502.

Under the effect of the shifting of the internal and additional pistons, the variable volume 15 increases and draws the brake fluid from the circuit 502, connected to a reservoir (not represented)

For as long as the additional piston is separated from the annular piston merely by a distance not exceeding a length of predetermined magnitude, the primary hydraulic chamber 12 and the volume 15 communicate with each other.

Beyond this distance, the communication closes and the pressure in the primary hydraulic chamber 12 rises until the effect of the pressure thus created on the section of the additional piston 10 balances the second part of the boost force, halting the shifting of the additional 10 and internal 14 pistons.

Further actuation of the operating rod 8 in the axial direction B acts via the plunger 24, the reaction disk 23 and the collar 25 on the annular piston 13 which, in moving, firstly closes the supply orifice 501 thus isolating the variable volume 15, then causes the fluid contained in the variable volume 15 to be pressurized, applying a further force to the additional piston 10 which then moves at the same time as the annular piston 13 and causes the brake pressure in the primary hydraulic chamber 12 to increase.

Figure 2:
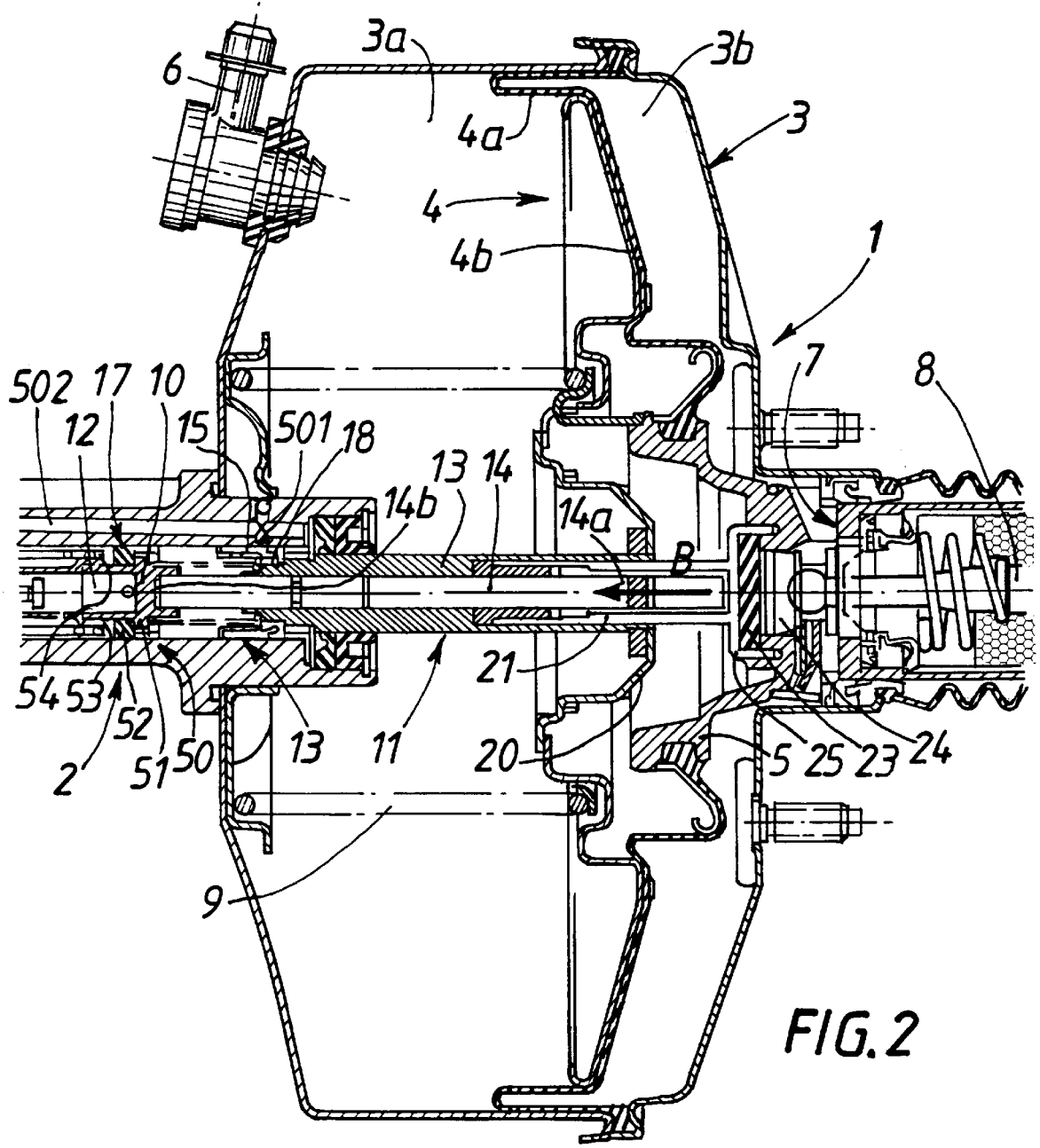
FIG. 2 is a part section view of the same device, represented in a state where braking is initiated.
Figure 3:
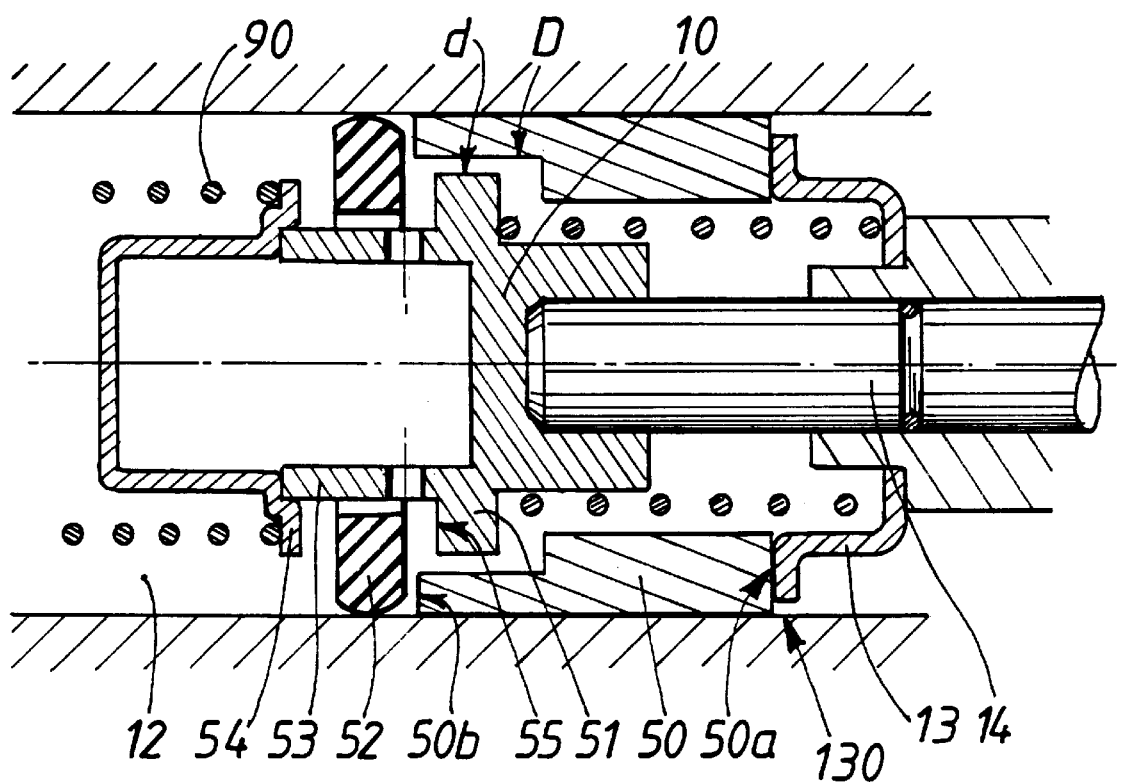
FIG. 3 is an enlarged view of a detail of FIG. 1.

According to a first embodiment illustrated in FIGS. 1, 2 and 3, the additional piston 10 comprises a hollow bearing surface 53, pointing towards the primary hydraulic chamber 12, and bearing a collar 51 of outside diameter d, itself including a bearing face 55, and a stop ring 54 itself bearing against the end of the return spring 90, while a seal 52 slides over the hollow bearing surface between the bearing face 55 of the collar 51 and the stop ring 54.

A sliding ring 50, sliding in the bore 130, has two ends, of which the first 50a bears against the annular piston 13 while the second 50b, of inside diameter D greater than the outside diameter d of the collar 51, can come into contact with the seal 52 beyond the bearing face 55 of this collar.

As a result, as long as the additional piston 10, pushed back by the return spring 90, is at rest, the sliding ring 50 keeps the seal 52 away from the bearing face 55, thus creating a communication between the primary hydraulic chamber 12 and the variable volume 15, while this communication is interrupted as soon as the seal 52 bears against the bearing face 55.

Figure 4:
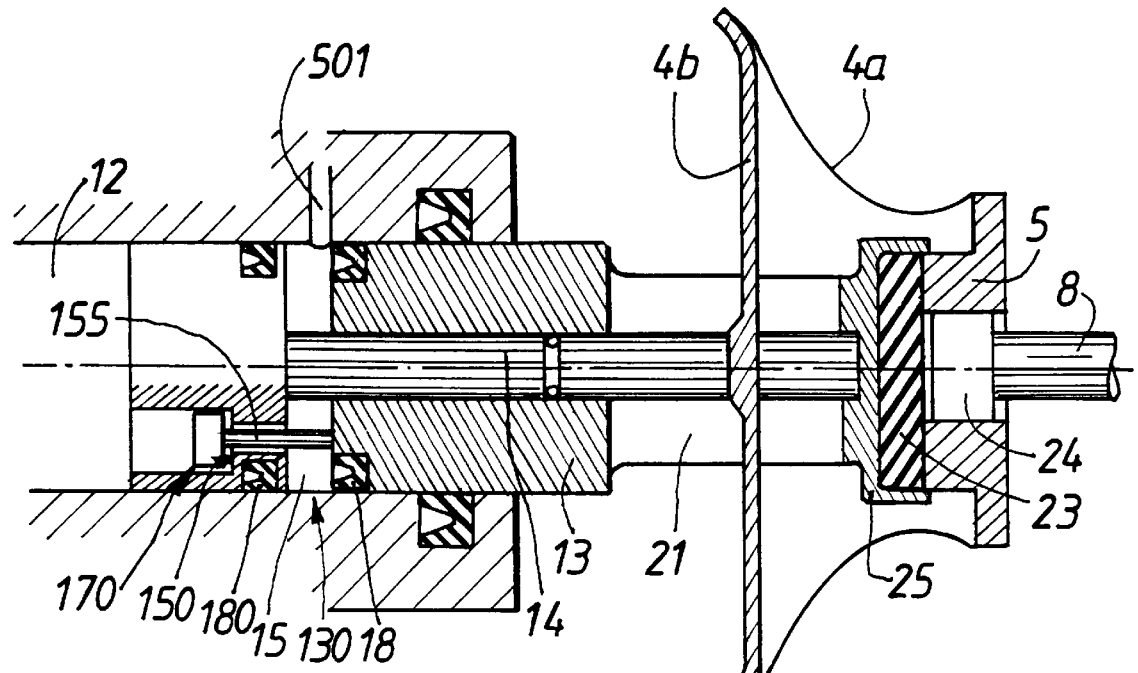
FIG. 4 is a part diagrammatic view of the device in accordance with the second embodiment of the invention.

According to a second embodiment illustrated in FIG. 4, the additional piston 10 comprises a passage 170 made parallel to the axis of movement of the piston and bearing a seat 150 selectably closed off by a valve, this valve being operated by a push-rod 155 which can bear against the annular piston 13.

As a result, when the additional piston 10 is at rest, the push-rod 155 frees the seat and provides the communication between the primary hydraulic chamber 12 and the variable volume 15.

Figure 5:
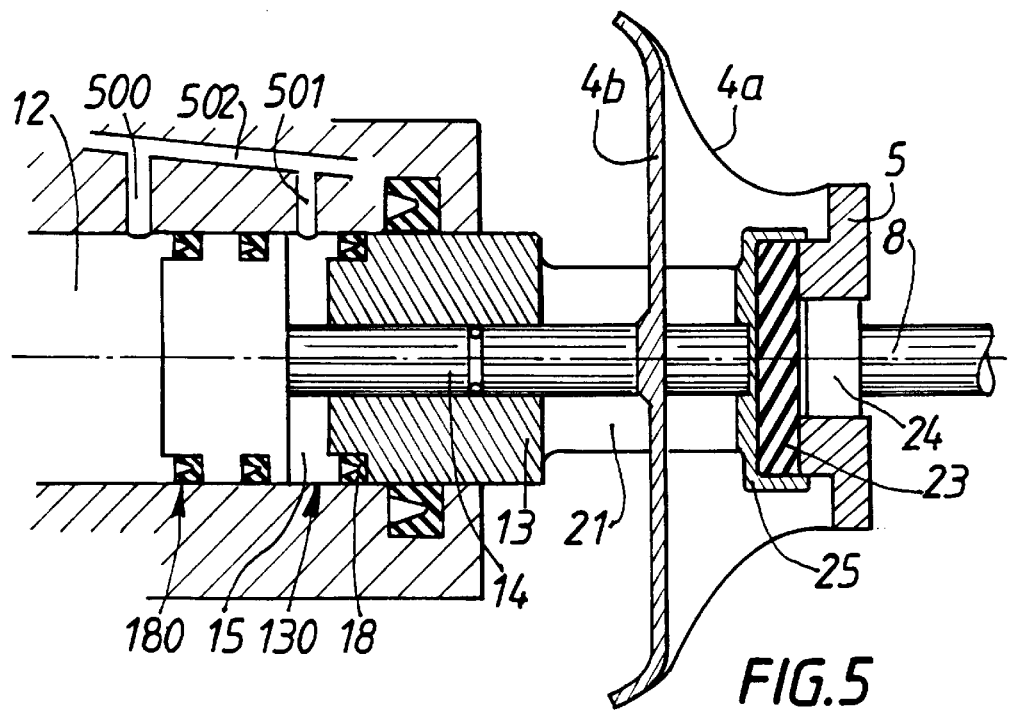
FIG. 5 is a part diagrammatic view of a device in accordance with a third embodiment of the invention.

According to a third embodiment illustrated in FIG. 5, the communication means comprises an orifice 500 open in the primary hydraulic chamber 12 and connected to the low-pressure brake fluid supply circuit 502, and therefore to the orifice 501, itself in communication with the variable volume 15.

As a result, when the additional piston 10 is at rest, the primary hydraulic chamber 12 is in communication with the variable volume 15.

This communication is interrupted when the secondary hydraulic piston 14 moves, as soon as the distance between the hollow moving cylinder 13 and the secondary hydraulic piston 14 does not exceed the length of predetermined magnitude.

A variant common to all the embodiments makes it possible to envisage the internal piston 14 and the additional piston 10 made of at least two elements.

Figure 6:
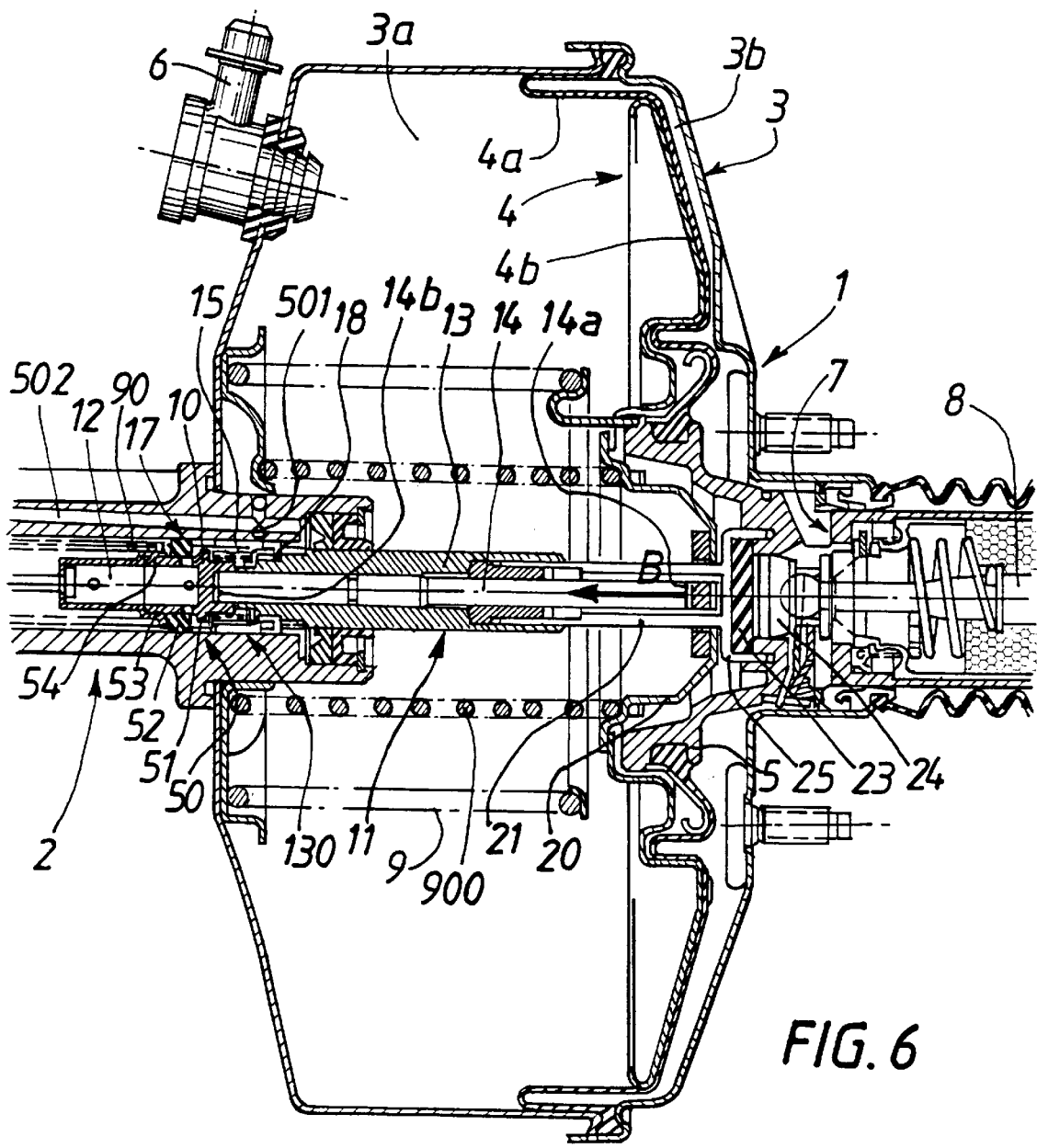
FIG. 6 is a part sectional view of a device in accordance with a fourth embodiment of the invention, represented in its position of rest.

According to a fourth embodiment illustrated in FIG. 6, the piston 11 is brought in position of rest, by a spring 900 permitting at the time of penetration of the operating rod 8, a better control of the effects of transfer of the pneumatic piston 5 against the moving partition 4.

We claim:

1. A boosted braking device for a motor vehicle, comprising: a master cylinder having at least one primary hydraulic chamber filled with a brake fluid and closed by a main hydraulic piston designed to receive an actuating force composed of an input force and a boost force, said input force and boost force both acting in an axial direction; and a pneumatic booster capable of applying said actuating force to said main hydraulic piston, in response to an operating rod controlling an opening of a valve carried by a pneumatic piston which moves with said operating rod, said booster having a rigid casing divided in a leaktight fashion into first and second chambers by a movable partition which is urged by a pressure difference established selectively between said first and second chambers through the communication of a fluid pressure as a result of the opening of said valve, said input force being transmitted via a reaction disk against which said pneumatic piston also bears in order to supply it with a first part of said boost force, said movable partition being slidably mounted on said pneumatic piston; said main hydraulic piston comprising an annular piston sliding in a leaktight fashion in a bore of said master cylinder and an internal piston sliding in a leaktight fashion inside said annular piston, characterized in that said reaction disk bears against said annular piston and said movable partition bears against said internal piston in order to transmit a second part of said boost force thereto, and in that said main hydraulic piston includes an additional piston for receiving a thrust from said internal piston to move said additional piston in said bore, a variable annular volume which is connected to a low-pressure brake fluid supply circuit for as long as said annular piston has not moved to a position to initiate braking, and in that communication means are provided to establish, between said annular volume and said primary hydraulic chamber, a communication allowing the passage of brake fluid only provided that said additional piston is distant from said annular piston merely by a distance not exceeding a length of a predetermined magnitude.

2. The boosted braking device as recited in claim 1 characterized in that said communication means includes:

a projection on said additional piston forming a hollow bearing surface pointing towards the primary hydraulic chamber;

a seal sliding over said hollow bearing surface between a bearing face of a collar of outside diameter of said additional piston and a stop ring connected with said bearing surface; and a sliding ring sliding in said bore, said sliding ring having a first end which bears against said annular piston and a second end, said second end having an inside diameter greater than an outside diameter of said collar, said second end coming into contact with said seal at a point beyond a bearing face of said collar to opening up communication when said additional piston is separated from said annular piston merely by said distance not exceeding said predetermined magnitude.

3. The boosted braking device according to claim 1, characterized in that said communication means comprise:

a passage made in said additional piston, said passage having a seat selectively closed off by a sealing member operated by a push-rod capable of bearing against the annular piston in order to free said seat when said additional piston is separated from said annular piston merely by said distance not exceeding said predetermined magnitude.

4. The boosted braking device according to claim 1, characterized in that said communication means comprise:

a passage in said master cylinder with an orifice open into said primary hydraulic chamber, said passage being connected to said low-pressure brake fluid supply circuit and uncovered when said distance said annular piston and said internal piston does not exceed said predetermined magnitude.

5. The booster brake device according to claim 1, characterized in that said internal piston and said additional piston are made of at least two elements.

\* \* \* \* \*